United States Patent [19]

Revell

[11] Patent Number: 4,680,039
[45] Date of Patent: Jul. 14, 1987

[54] SELF-CONTAINED DUST COLLECTOR WITH QUICK RELEASE ADAPTER DUCT

[75] Inventor: Alan E. Revell, Louisville, Ky.

[73] Assignee: Allis-Chalmers Corporation, Milwaukee, Wis.

[21] Appl. No.: 864,420

[22] Filed: May 19, 1986

[51] Int. Cl.⁴ .............................................. B01D 46/48
[52] U.S. Cl. ..................... 55/341 R; 55/358; 55/429; 55/DIG. 12; 141/337; 285/235
[58] Field of Search ...................... 55/341 R, 358, 366, 55/429, 428, DIG. 12; 141/93, 337, 338, 391, 332, 331; 222/527; 285/176, 235, 260

[56] References Cited

U.S. PATENT DOCUMENTS

| | | | |
|---|---|---|---|
| 1,234,057 | 7/1917 | McIntyre | 141/391 X |
| 1,247,354 | 11/1917 | Welsh | 141/337 |
| 2,007,189 | 7/1935 | Fox | 55/429 X |
| 2,100,888 | 11/1937 | Vine | 141/337 |
| 3,166,391 | 1/1965 | Keser | 55/429 X |
| 4,323,376 | 4/1982 | Rosenquest | 55/DIG. 12 X |

FOREIGN PATENT DOCUMENTS 540955 1/1932 Fed. Rep. of Germany ...... 285/235
544979 5/1942 United Kingdom ............... 285/235

OTHER PUBLICATIONS

"Pangborn Dust Control for Industry", Bulletin No. 922 B, The Pangborn Corp., Hagerstown, Md. p. 9.

Primary Examiner—Kathleen J. Prunner
Attorney, Agent, or Firm—Donald C. McGaughey

[57] ABSTRACT

A self-contained dust collector which includes a quick release adaptor duct mounted between a filter unit and a storage receptacle for conveying dust to the receptacle with the quick release adaptor duct comprising a planar member having a central opening and a plurality of pleats which permit the outer periphery of the planar member to either be (1) lengthened as the planar member is moved from a closed duct forming position in which the duct provides a sealed transition duct for conveying dust into the receptacle to an open nonduct forming position spaced away from the receptacle or (2) shortened as the planar member is moved from the open nonduct forming position into the closed duct forming position in which the outer periphery of the planar member is placed under tension to maintain the periphery in sealed relation to the receptacle.

11 Claims, 8 Drawing Figures

SELF-CONTAINED DUST COLLECTOR WITH QUICK RELEASE ADAPTER DUCT

FIELD OF THE INVENTION

This invention relates to a self-contained dust collector and more specifically to a quick release adapter duct for use in such a dust collector to convey dust from a hopper discharge port to an inlet port of a removable dust storage receptacle supported by the dust collector.

SUMMARY OF THE INVENTION

Self-contained dust collectors are self-standing units used in enclosed areas for recirculating the dust laden air in such areas through the collector to trap and remove the dust. Such dust collectors utilize a fan to create a high static pressure for recirculating the dust laden air through a dirty air inlet and filters in the dust collector with fabric pockets that trap and collect the dust. The dust is periodically dislodged from the filter pockets by shaking the filter. The dislodged dust falls into a dust hopper. The dust hopper has a discharge port connected to an inlet port of a dust storage receptacle removably mounted on the dust collector in spaced relation to the discharge port. In the prior art dust collectors, the discharge port to inlet port connection comprises a large diameter flexible, extensible hose which conveys the dust from the hopper discharge port to the inlet port of the receptacle. The flexible hose is releasably clamped to suitable adapters on the hopper discharge port and the receptacle port. The flexibility and extensibility of the hose is necessary to permit the hose to be disconnected so that the dust receptacle can be emptied. In operation, the high static pressure generated by the fan creates a high suction at both the dirty air inlet and the hopper discharge port. Because the hose is extensible and connected between the hopper and the receptacle, this suction will raise an empty or partially empty dust storage receptacle from its base and as long as the fan is running, the storage receptacle will remain suspended until it acquires sufficient dust to arrive at a total weight which will overcome the force of the suction. When the fan is turned off, the receptacle will drop abruptly back to the base of the dust collector. To eliminate the danger attending the abrupt drop of a suspended receptacle when the fan is turned off, a receptacle hold-down apparatus is releasably mounted on the frame of the dust collector and placed into contact with the receptacle to hold it down during normal operation.

The dust storage receptacle must be emptied or replaced on a regular basis, as much as several times a week under severe dust conditions. Before the dust storage receptacle can be emptied or replaced, a time consuming disconnection of the flexible hose must be made. In addition, the hold-down apparatus must also be released and removed. After the receptacle is emptied, both the flexible hose and the hold-down apparatus must be reattached. The large diameter hose and hold-down apparatus have a high initial cost and the cost of labor necessary to detach and reattach these items each time the receptacle is emptied significantly adds to the total cost of buying and operating a self-contained dust collector.

The present invention provides a quick release adapter duct that eliminates the need for both the expensive flexible hose and the hold-down apparatus. The quick release adapter duct includes a planar member having an inner central opening and a plurality of pleats. The pleats permit the outer periphery of the planar member to be lengthened or shortened, thus allowing the adapter duct to be quickly placed in either (1) a closed duct forming position in which the adapter duct provides a sealed transition duct from the hopper discharge port to the receptacle dust receiving port, or (2) an open nonduct forming position in which the planar member is elevated and disengaged from the adapter duct to permit quick removal of the receptacle for emptying or replacement. The planar member presents an integral receptacle hold-down which automatically engages, centers and holds the receptacle down when the planar member is moved to the closed duct forming position. The periphery of the planar member is placed under resilient tension to maintain the periphery in sealed relation to the receptacle.

It is an object of the present invention to provide an improved, inexpensive, quick release adapter duct that is, when installed, easily moved to either an open nonduct forming position or a closed duct forming position between first and second spaced apart openings.

It is another object of this invention to provide a quick release adapter duct having an integral receptacle hold-down that automatically engages and holds the receptacle down when the adapter duct is moved to a closed duct forming position.

It is a further object of this invention to provide a quick release adapter duct that is simple yet durable and which can be inexpensively manufactured from a unitary piece of semiflexible planar material.

These and other objects and advantages of this invention will become apparent from the drawings and the following detailed description.

DETAILED DESCRIPTION OF THE INVENTION

Figure 1:
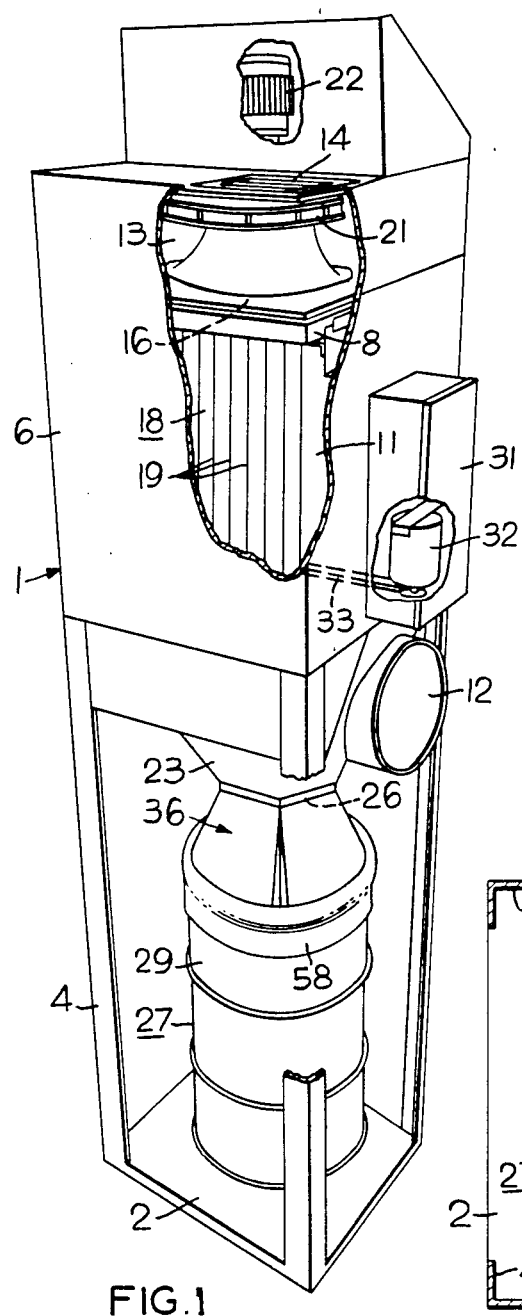
FIG. 1 is a perspective view of the self-contained dust collector and quick release adapter duct with some parts broken away.
Figure 2:
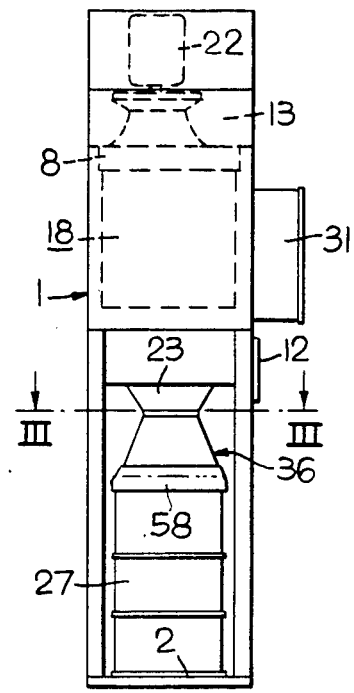
FIG. 2 is a side elevation view of the dust collector shown in FIG. 1.

Referring to FIG. 1, the self-contained dust collector comprises a frame 1 including a rectangular base 2 on which are mounted four vertically extending support legs 4. A housing 6 is mounted on the legs 4. A partition means 8 is mounted in the housing 6 to divide it into a dirty air chamber 11 having a dirty air inlet 12 and a clean air chamber 13 having a clean air outlet 14. The partition means 8 has an aperture 16 therethrough connecting the dirty air chamber 11 in air flow communication with the clean air chamber 13.

A filter means 18 is operatively mounted in the housing 6 across the aperture 16. The filter means 18 preferably comprises a fabric filter cartridge having a plurality of spaced apart pockets 19. Any suitable means, such as a high static pressure fan 21 driven by a fan motor 22, may be provided for circulating dirty air through dirty air inlet 12 into dirty air chamber 11 through the pockets 19 of the filter means 18, into the clear air chamber 13 and out clean air chamber outlet 14.

A hopper 23 is mounted on the frame 1 in a position to collect dust dislodged from the filter means 18 as will be more fully described hereinafter. The hopper 23 has a first opening in a bottom portion thereof constituting a collected dust discharge port 26. A dust storage receptacle 27 is removably mounted on the base 2 of frame 1 below the hopper 23 and has a second opening 28 constituting a dust receiving port. The dust receptacle 27 is formed by wall means 29 and may be of any suitable shape. A standard 30 or 55 gallon drum makes an excellent low cost dust storage receptacle.

As the dust laden air passes through the filter means 18, the fine dust particles are trapped on the surface of the pockets 19 forming a dust cake. The dust cake is periodically removed from the filter pockets by shaking. FIG. 1 shows an automatic shaking system 31 which includes an electric motor 32 driving a shaker bar 33 which is connected to the bottom of each filter pocket 19. If desired, a manually operated shaker lever (not shown) could be substituted for the motor 32. Periodic reciprocation of the shaker bar 33 shakes the filter pockets 19 causing the filter cake to be dislodged and fall through the hopper discharge port 26 into the dust storage receptacle 27.

Figure 7:
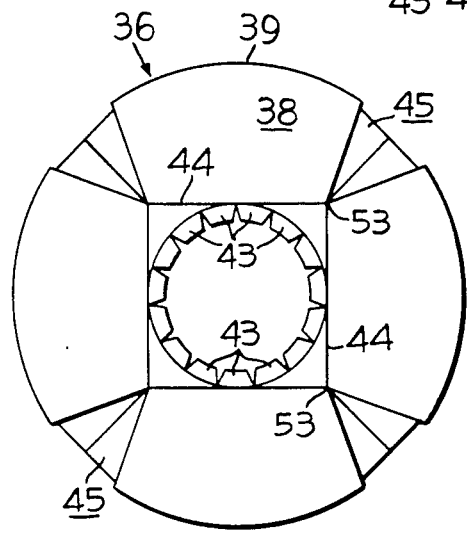
FIG. 7 is a plan view of a modified form of the adapter duct.
Figure 8:
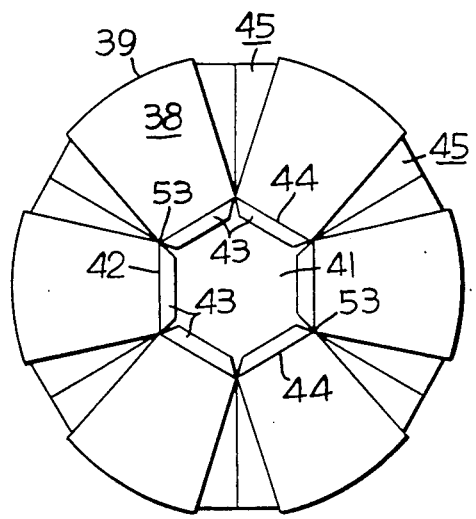
FIG. 8 is a plan view of another modified form of adapter duct.

A quick release adapter duct 36 is mounted between the first opening (hopper discharge port 26) and the second opening (dust storage receptacle port 28). The adapter duct 36, as best shown in FIG. 5, comprises a semiflexible unitary planar member 38 having an outer periphery 39 and an inner central opening 41 having an inner periphery or margin 42. The inner central opening 41 has a straight or curved sided inner periphery or margin 42 dimensioned as required to make it conform to the shape and size of the hopper discharge port 26. Flanges 43 are each pivotally joined to the margin 42 for pivotal movement about a main pivot axis 44 to permit the planar member 38 to be swingably mounted in sealed relation around hopper discharge port 26. The planar member 38 shown in FIG. 5 has four straight margins and four corresponding flanges 43 arranged to define a rectangular inner central opening. The flanges 43 can be arranged to accommodate any shape of discharge port as, for example, round as shown in FIG. 7 or octagonal as shown in FIG. 8. The flanges 43, preferably are integral with the planar member 38 with the main pivot axes 44 formed by the score lines in the surface thereof. The flanges 43 may be independently mounted on planar member 38 to provide the swingable sealed connection between the planar member 38 and hopper 23. The flanges 43 are secured to the hopper 26 by any suitable means such as rivets or bolts 37 as shown in FIG. 4.

Figure 3:
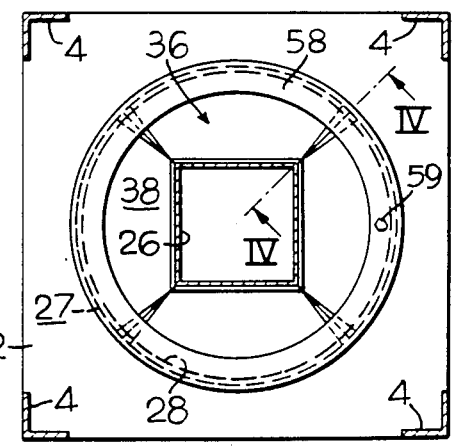
FIG. 3 is an enlarged sectional view taken along the line III—III of FIG. 2.
Figure 5:
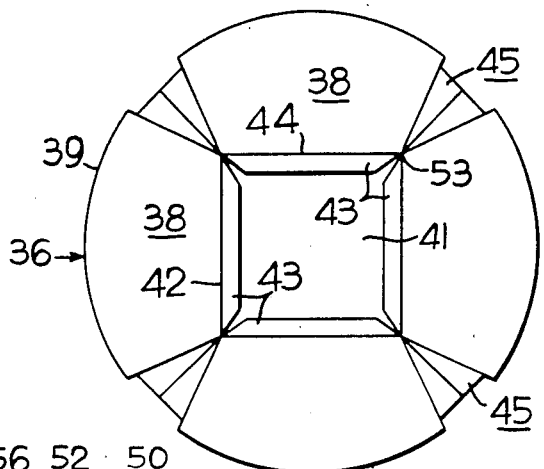
FIG. 5 is a plan view of the adapter duct showing said duct in a noninstalled open nonduct forming position.
Figure 6:
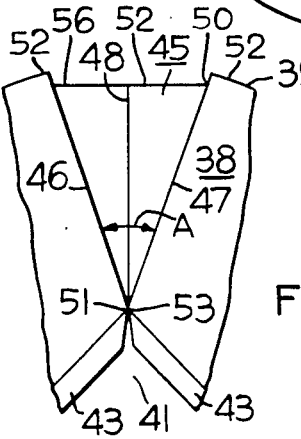
FIG. 6 is an enlarged partial view of the planar member of FIG. 5 showing one of the pleats in detail.

The planar member 38 includes a plurality of foldable pleats 45. The foldable pleats are movable between closed or open attitudes to allow lengthening of the outer periphery 39 as will be explained further hereinafter. As best shown in FIG. 6, each of the foldable pleats 45 is preferably formed by a pair of angularly spaced out-fold axes 46, 47 and a single in-fold axis 48 between said out-fold axes. Two or more in-fold axes could be used if desired. Preferably, the fold axes 46, 47, 48 are an integral part of and formed by score lines in the surface of the semiflexible material out of which the planar member 38 is made. However, the fold axes could be constituted by separate hinges and the pleat 45 could be independently formed and suitably joined to the planar member by the hinges. Each fold axis has an inner end 51 and an outer end 52. The inner ends 51 of the fold axes intersect to form an acute angle A, the vertex of which is located adjacent the inner central opening. When the inner opening 41 is defined by intersecting straight margins 42, as shown in FIGS. 5 and 8, each vertex 53 terminates adjacent the corner formed by the intersection of two adjoining margins which will be coterminous with the main axes 44. When the inner opening 41 is a closed plane curve, such as the circle shown in FIG. 7, each vertex 53 terminates, adjacent the corner defined by the intersection of two main pivot axes 44. The outer ends 52 of the fold axes 46, 47, 48 of each pleat 45 terminate at spaced apart points on the outer periphery 39. The points are spaced from each other along the outer periphery 39 a distance sufficient to allow the outer periphery 39 to expand in length, as the pleats 45 are moved to an open attitude along the fold axes, at least a total distance that will permit the planar member 38 to swing or pivot about the main pivot axes 44 from a closed duct forming position shown in FIGS. 1 and 3 to an open nonduct forming position vertically spaced from and out of contact with the dust storage receptacle 27.

Figure 4:
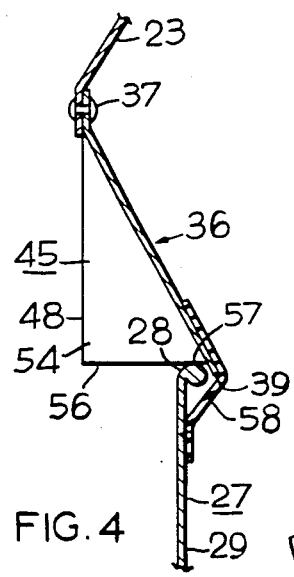
FIG. 4 is a partial sectional view taken along the line IV—IV of FIG. 3.

When the adapter duct 36 is in the closed duct forming position as shown in FIG. 1, each in-fold axis 48, as best appears in the partial section of FIG. 4, is folded inwardly toward the center of the dust receiving port 28 to form a triangular shaped hold-down 54 having a base portion 56 which contacts the rim 57 of the dust storage receptacle 27 to hold it down. The base portion 56 of the pleat preferably is recessed at 50 into the outer periphery 39 of the planar member 38 to permit the outer periphery to project beyond the rim 57 of the dust storage receptacle when in a closed duct forming position. The projecting outer periphery 39 will automatically center the receptacle as the planar member 38 is being moved to the closed duct forming position. Further, the projecting outer periphery 39 will secure the receptacle against lateral displacement.

The planar member 38 is held in the closed duct forming position by a resilient means 58 that maintains tension on the planar member 38 to hold it in contact with the rim 57 of the receptacle. Preferably, the resilient means 58 comprises an endless resilient band having a width which is sufficient to cover and seal the juncture between the outer periphery 39 of the planar member 38 and the rim 57 of the dust receptacle wall 29. To prevent the resilient band 58 from being removed and carried away with the dust storage receptacle 27, it is desirable to secure the band 58 to the planar member 38 by a fastening device such as bolt 59, FIG. 3. In the alternative, a resilient gasket could be placed around the rim 57 and the outer periphery could be urged into sealing contact with the gasket by spring means which would bias the pleats 45 into a closed attitude.

In operation, dust laden air is drawn into inlet 12 and through the pockets 19 in the filter means 18. The dust-free air exits clean air outlet 14. The dust particles are trapped on the surface of the pockets 19 forming a dust cake. Periodically, dust cake is shaken loose from the pockets and falls into the dust storage receptacle 27. The pleats 45 contact the rim 57 and constitute a stop means to prevent fan suction from elevating the dust storage receptacle 27 above base 2. When the dust storage receptacle 27 is full the fan 21 is turned off. The resilient band 58 is moved upward out of contact with the receptacle 27 and the outer periphery 39. As the outer periphery 39 of adapter duct 36 is raised, the pleats 45 open and the planar member 38 pivots about the main axes 44 automatically elevating the hold-down pleats 45 out of contact with rim 57. The outer periphery 39 is lengthened as the pleats open permitting the planar member to move upwardly past horizontal to a fully open position above receptacle 27. If desired, the resilient means could be used to apply a pleat closing force to the pleats 45 thus holding the planar member in the open position once it is elevated past a horizontal position. The dust storage receptacle 27 is then either removed and emptied or replaced and the planar member 38 moved downward back into the closed duct forming position with the pleats 45 automatically engaging the rim 57 to again center and hold the receptacle 27 down.

From the foregoing, it is apparent that the invention provides a simple, low cost adapter duct providing a releasable dust conveying transition duct from a first opening to a second opening that automatically positions and holds a dust storage receptacle in a fixed dust receiving position. The foregoing description is illustrative only and modifications and changes utilizing the inventive concept will occur to others skilled in the art. Therefore, the specific structure shown is by way of example and should not be regarded as implying any limitation of the inventive concept to the embodiments shown.

What is claimed is:

1. In a self-contained dust collector comprising a support frame; a housing mounted on said frame having partition means therein dividing said housing into a dirty air chamber having a dirty air inlet and a clean air chamber having a clean air outlet, said partition means having an aperture therethrough connecting said dirty air chamber in air flow communication with said clean air chamber; a filter means operatively mounted across said aperture; means for circulating dirty air through said dirty air inlet, into said dirty air chamber, through said filter means into said clean air chamber and out said clean air outlet; a hopper mounted on said frame in dust receiving relation to said filter means and having a first opening constituting a dust discharge port; and a dust storage receptacle spaced from said dust discharge port and having wall means defining a second opening constituting a dust receiving port, the improvement comprising a quick release adapter duct movable to either an open nonduct forming position or a closed duct forming position relative to said storage receptacle, said adapter duct including:
   a semiflexible unitary planar member having an outer periphery and an inner central opening swingably mounted in sealed relation around said dust discharge port;
   a plurality of foldable pleats in said planar member, each of said foldable pleats defined by angularly spaced fold axes on said planar member, each of said fold axes having an outer and an inner end, all of said inner ends of said fold axes for each of said pleats intersecting to form an acute angle having a vertex which is located adjacent said inner central opening, all of said outer ends of said fold axes for each of said pleats terminating at spaced points on said outer periphery;
   said foldable pleats being movable between an open attitude lengthening said outer periphery to cause said planar member to assume said open nonduct forming position and to a closed attitude shortening said outer periphery to cause said planar member to assume said closed duct forming position in which said outer periphery of said planar member is in contact with said receptacle wall means in surrounding relation to said dust receiving port; and
   resilient means urging said pleats into said closed attitude to maintain said outer periphery of said planar member in sealed contact with said receptacle wall means when said adapter duct is in said closed duct forming position.

2. A self-contained dust collector according to claim 1 wherein said planar member includes receptacle hold-down means thereon to contact and hold-down said receptacle when said adapter duct is in said closed duct forming position relative to said receptacle.

3. A self-contained dust collector according to claim 1 wherein each of said foldable pleats is defined by a pair of angularly spaced out-fold axes and a single in-fold axis spaced between said out-fold axes, each of said axes of one pleat terminating at said inner end thereof at a common vertex and at their said outer end at spaced points on said outer periphery.

4. A self-contained dust collector according to claim 3 wherein each of said foldable pleats, when said adapter duct is in said closed duct forming position, have said in-fold axes folded inwardly toward said dust receiving port to form a triangular shaped hold-down having a base portion in contact with said receptacle.

5. A self-contained dust collector according to claim 1, wherein said resilient means comprises an endless resilient band having a width sufficient to cover the juncture between said outer periphery of said planar member and said receptacle wall means, said band when installed being in tension to maintain said planar member in sealed contact with said receptacle.

6. A quick release adapter duct which is movable to either an open nonduct forming position or a closed duct forming position, said quick release adapter duct comprising:
   a semiflexible unitary planar member having an outer periphery and an inner central opening defined by intersecting straight margins; and
   a plurality of foldable pleats in said planar member, each of said foldable pleats having fold axes on said planar member that intersect to form an acute angle the vertex of which is located adjacent said intersection of said straight margins of said inner central opening, said foldable pleats being movable from a closed to an open attitude to allow lengthening of said outer periphery permitting quick release from said closed duct forming position.

7. A quick release adapter duct according to claim 6 wherein each of said foldable pleats is defined by a pair of angularly spaced out-fold axes and a single in-fold axis spaced between said out-fold axes, all of said axes of each pleat terminating at a common vertex.

8. A quick release adapter duct according to claim 7 wherein said in-fold axis is spaced equidistant between said out-fold axes.

9. A quick release adapter duct movable to either an open nonduct forming position or a closed duct forming position and adapted for installation between spaced apart first and second openings, said quick release adapter duct comprising a unitary semiflexible member having an inner central opening and an outer periphery and a plurality of foldable pleats in said planar member, each of said foldable pleats including at least two angularly spaced fold axes, each fold axis having inner and outer ends with said inner ends of said fold axes of each pleat interconnecting to form an acute angle the vertex of which is located adjacent said inner central opening, and said outer ends of said fold axes of each pleat terminating at spaced apart points on said outer periphery, said points spaced from each other along said outer periphery a distance sufficient to allow said outer periphery to expand in length as said pleats are opened along said fold axes to permit said planar member to be moved from said closed duct forming position into said open nonduct forming position.

10. A quick release adapter duct according to claim 9 wherein:
  said inner central opening is defined by intersecting straight sides, and
  said vertex of each pleat terminates adjacent said intersection of said straight sides.

11. A quick release adapter duct according to claim 10 wherein:
  said sides of said inner central opening of said planar member define a rectangle; and
  said planar member having four pleats, with said vertex of each pleat terminating at each of said corners of said rectangle.

* * * * *